Oct. 19, 1943.   H. W. HEMPEL ET AL   2,331,978
STENCIL MACHINE
Original Filed June 3, 1939   6 Sheets-Sheet 1
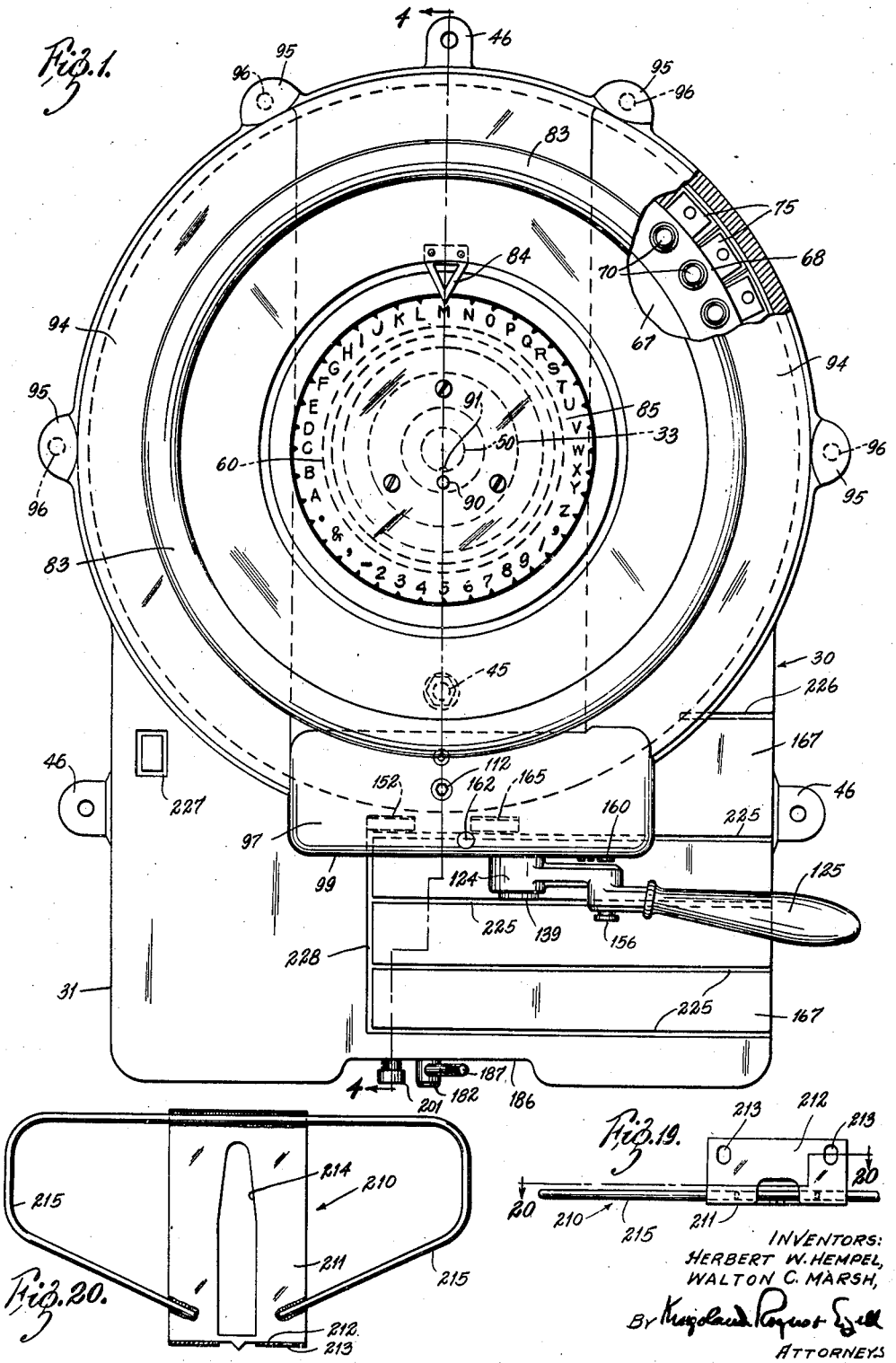
INVENTORS:
HERBERT W. HEMPEL,
WALTON C. MARSH,
ATTORNEYS

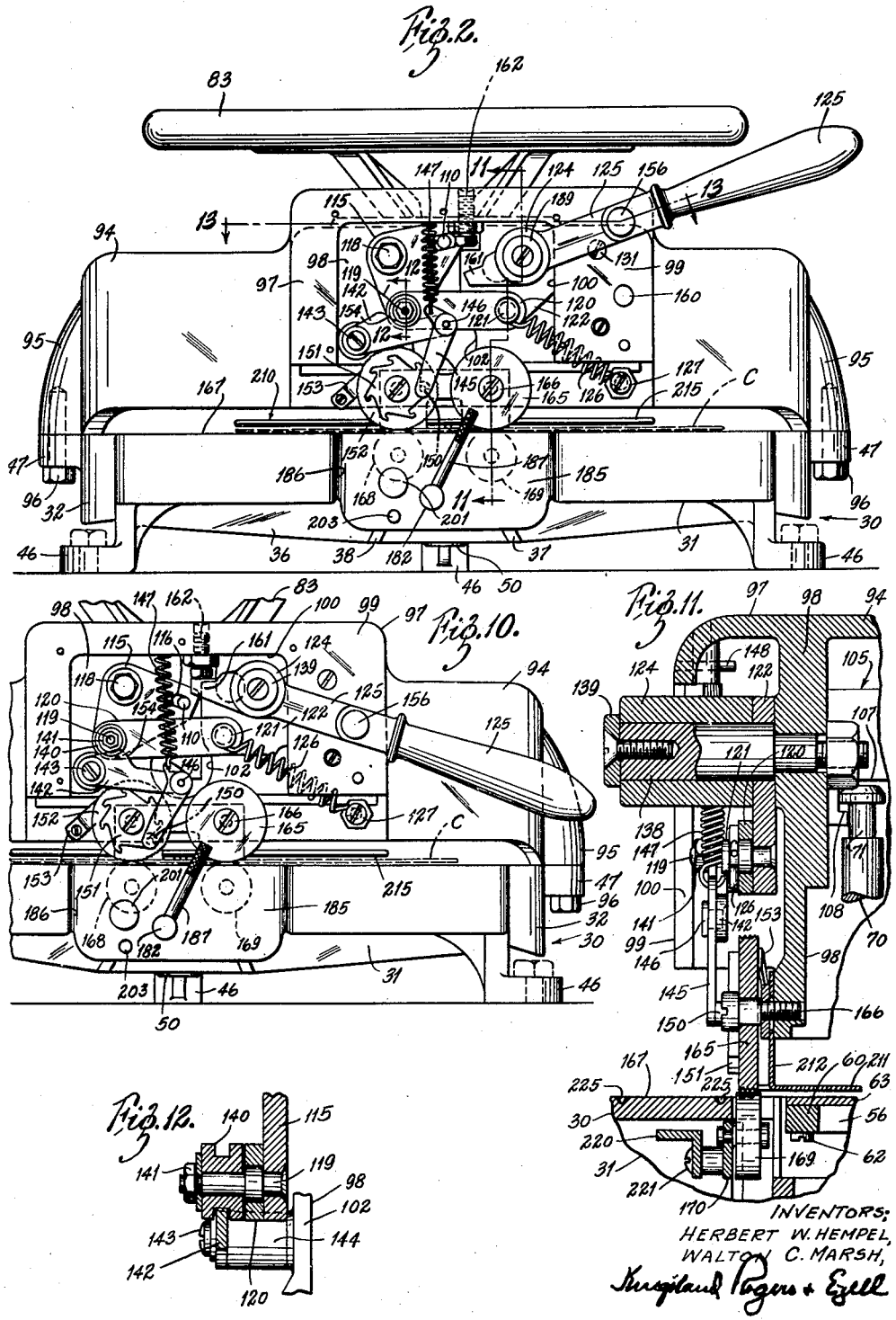

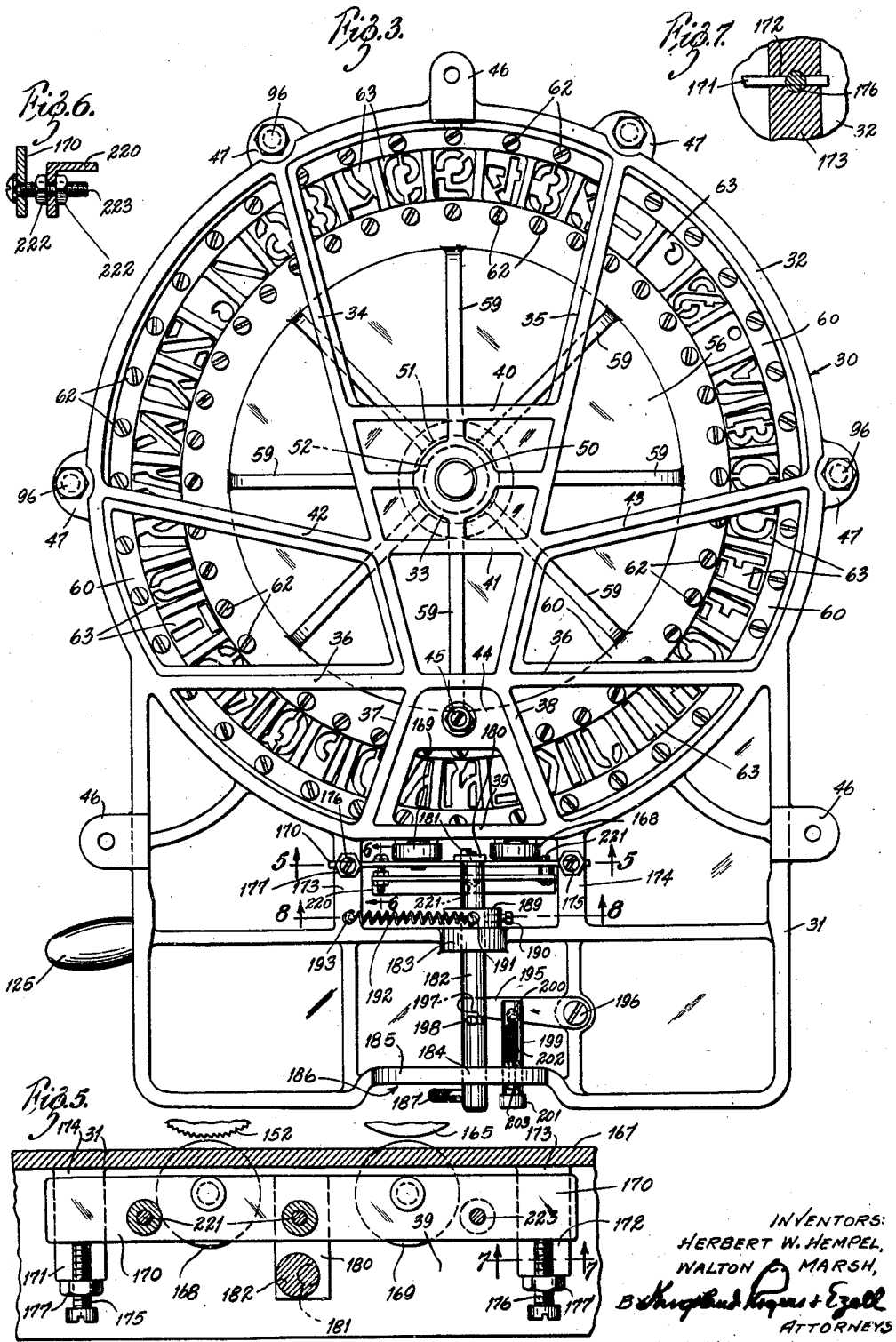

Oct. 19, 1943.  H. W. HEMPEL ET AL  2,331,978
STENCIL MACHINE
Original Filed June 3, 1939   6 Sheets-Sheet 4
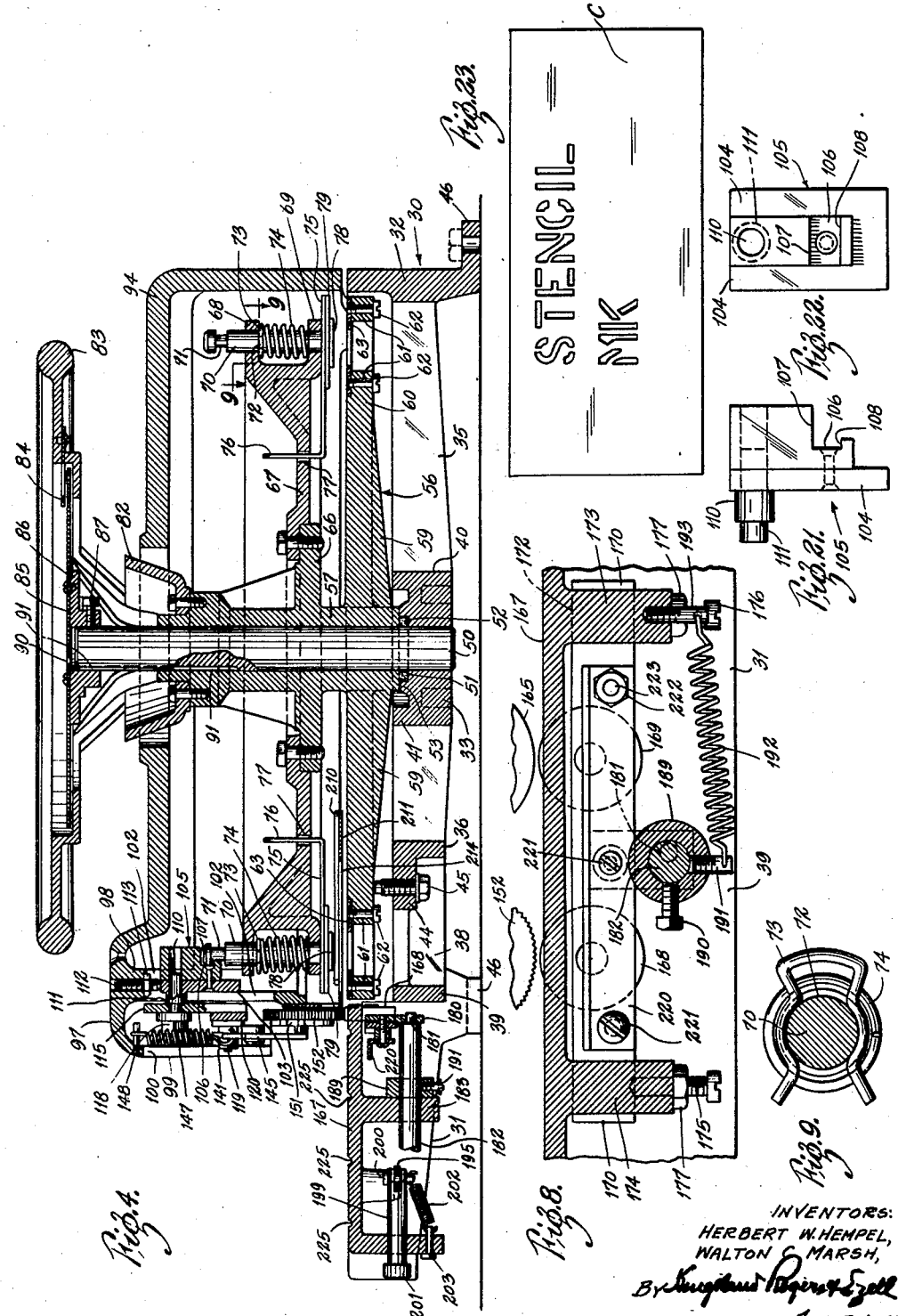
INVENTORS:
HERBERT W. HEMPEL,
WALTON C. MARSH,
ATTORNEYS

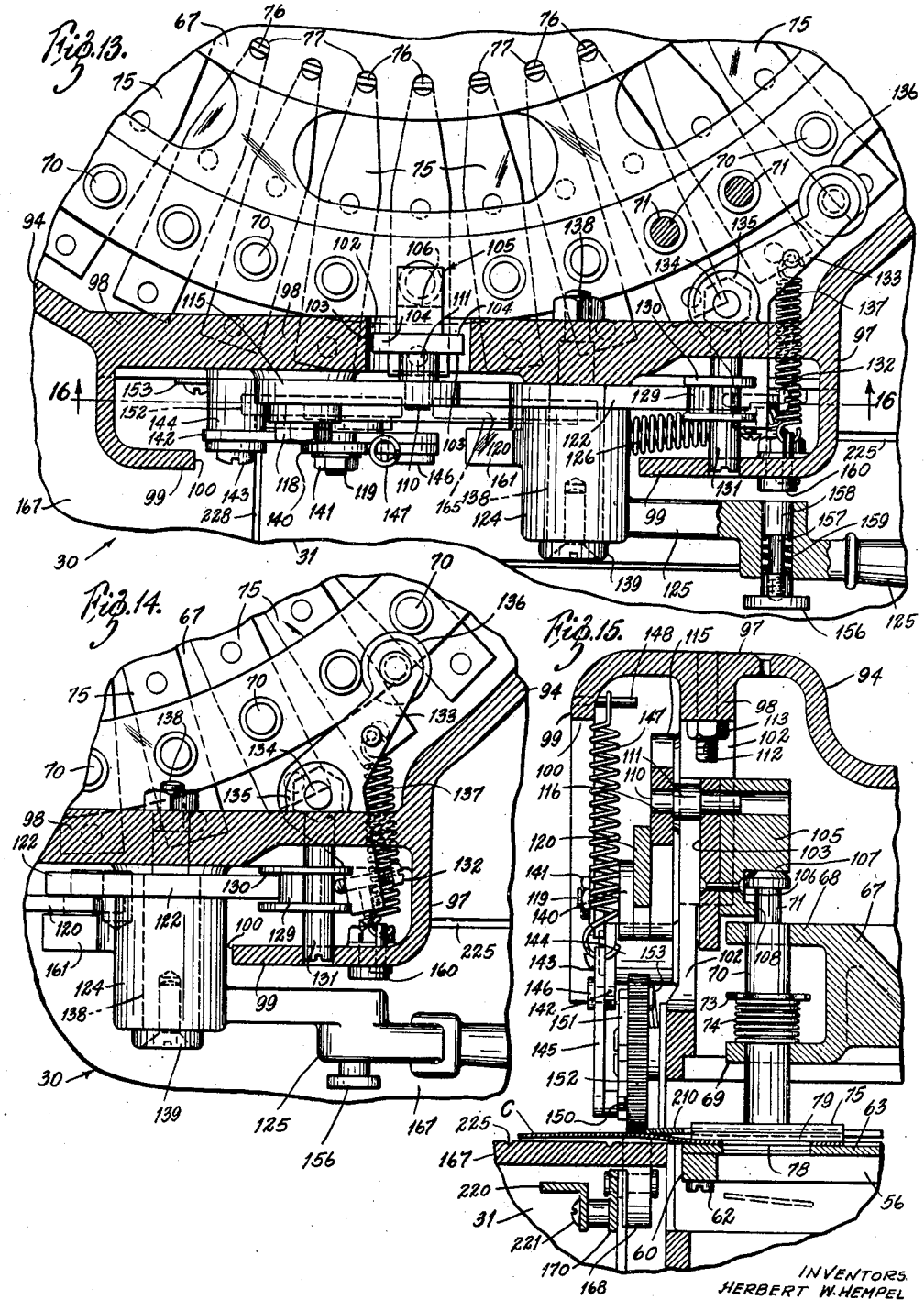

Oct. 19, 1943.  H. W. HEMPEL ET AL  2,331,978
STENCIL MACHINE
Original Filed June 3, 1939    6 Sheets-Sheet 6
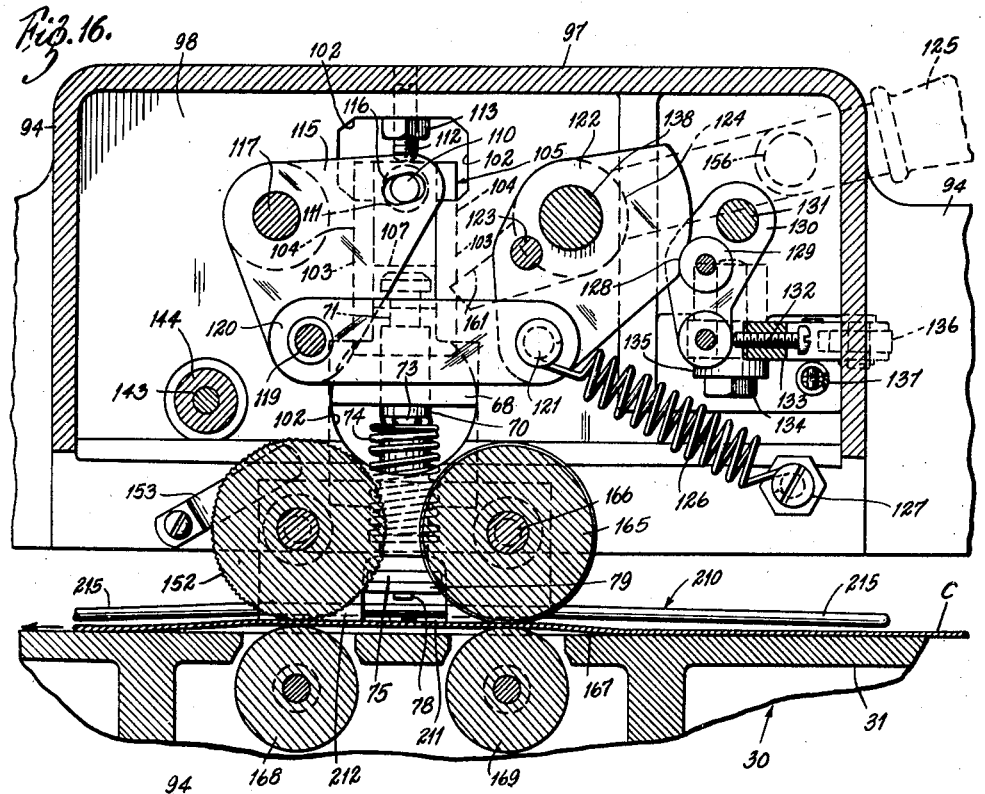
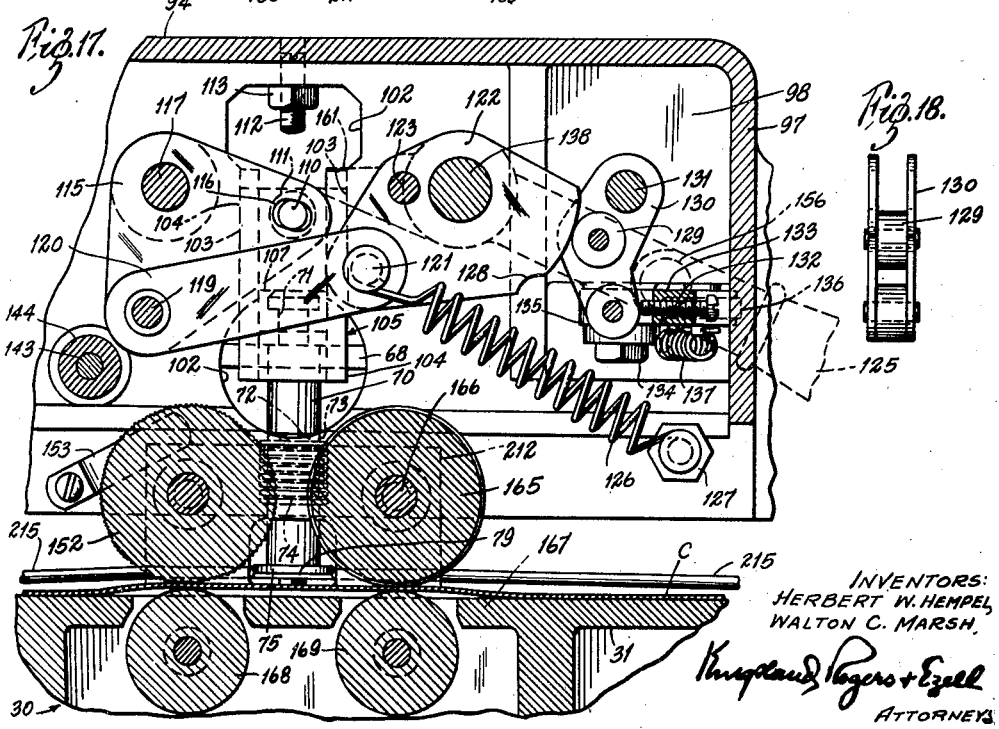
INVENTORS:
HERBERT W. HEMPEL,
WALTON C. MARSH,
ATTORNEYS Patented Oct. 19, 1943

2,331,978

UNITED STATES PATENT OFFICE 2,331,978

STENCIL MACHINE

Herbert W. Hempel and Walton C. Marsh, Belleville, Ill., assignors to Marsh Stencil Machine Company, Belleville, Ill., a corporation of Illinois Original application June 3, 1939, Serial No. 277,151. Divided and this application January 19, 1942, Serial No. 427,226

9 Claims. (Cl. 271—2.3)

The present invention comprehends a stencil cutting machine. It is a division of application 277,151 filed June 3, 1939. In machines of this kind, there is provided a series of punches and dies representing letters or other characters desired, and they are located on a carrier so that the ones used may be selectively brought into position of cutting. Locking mechanism, automatically operable, holds the carrier during cutting. A work feed, automatically operable with operation of the punches, advances the work through the machine for successive cuttings. Presser means clamp the work during the cutting.

Objects of the present invention are to provide a stencil machine having an operating handle and a linkage so arranged that several operations including centering and feeding are performed on the same stroke as is the cutting operation, to avoid partial spacing with consequent crowding or overlapping of letters; and the further provision for a greater power in the linkage during the cutting than during the other operations by the handle so that the movement of the handle may be short, and attendant greater speed during the other operations.

Other objects include the provision of readily accessible stop means cooperating with the handle to aid in spacing without cutting; and provision of a feed mechanism that may be conveniently adjusted for alignment, that distributes the clamping pressure on the work for maximum efficiency, and that may be adjusted as to pressure applied; and also the provision of a convenient latchable mechanism for withdrawing the presser rolls, and a release therefor.

In the drawings:

Fig. 1 is a plan view, partly broken away, of the machine;

Fig. 2 is a front elevation of the machine with the closure plate removed;

Fig. 3 is a bottom view;

Fig. 4 is a front-to-rear vertical section taken on the line 4—4 of Fig. 1;

Fig. 5 is a vertical transverse section taken on the line 5—5 of Fig. 3;

Fig. 6 is a sectional view on the line 6—6 of Fig. 3 transverse to Fig. 5;

Fig. 7 is a horizontal section of the elevation adjustments for the roller supports taken on the line 7—7 of Fig. 5;

Fig. 8 is a transverse vertical section on the line 8—8 of Fig. 3;

Fig. 9 is a horizontal section showing a clip adjustment for one of the punch springs and taken on the line 9—9 at the extreme right of Fig. 4;

Fig. 10 is a partial view similar to Fig. 2 but with the punch depressed;

Fig. 11 is a vertical section through the punch pressing and feed mechanism taken on the line 11—11 of Fig. 2;

Fig. 12 is a section on the line 12—12, immediately left of the center, of Fig. 2 showing the feeder cam in section;

Fig. 13 is a horizontal section on the line 13—13 of Fig. 2 showing the punch pressing mechanism and the centering mechanism both in retracted position;

Fig. 14 is a view similar to a part of Fig. 13 with the centering mechanism in active position;

Fig. 15 is a vertical longitudinal section similar to the left hand portion of Fig. 4 but with the punch depressed;

Fig. 16 is a transverse section of the front of the mechanism taken on the line 16—16 of Fig. 13, showing the punch press linkage in retracted position;

Fig. 17 is a view similar to Fig. 16 but with the mechanism in active position;

Fig. 18 is an edge view of the centering mechanism actuating cam;

Fig. 19 is an edge view of a stripper plate and guard;

Fig. 20 is a horizontal section of the stripper plate and guard taken on the line 20—20 of Fig. 19;

Fig. 21 is a side elevation of the punch plunger assembly;

Fig. 22 is a rear view thereof; and,

Fig. 23 is a view of a stencil sheet with cuts therein, such as are made by this machine.

The machine includes a base or bed 30 that has a portion 31 extending out of the front thereof and a rear circular portion 32. Centrally of the circular portion there is a journal box 33 supported by beams from the outer ring 32. The beams include two, 34 and 35, the direction of which follows lines drawn from the outer ring 32 at the center of the front to two points spaced approximately 60° apart at the rear. The two beams 34 and 35 terminate at a transverse beam 36 toward the front of the mechanism; and from the junctions therewith of the beams 34 and 35 extend outwardly beams 37 and 38 that terminate at the outer ring 32. The ring is flattened at 39 across the front. At the front and rear of the journal box 32 transverse beams 40 and 41 connect the two beams 34 and 35. From the opposite junctions of the beam 41 with the beams 34 and 35 there extend the beams 42 and 43 terminating approximately diametrically opposite on the ring 32. The foregoing arrangement of beams and their shapes, as indicated, are such as to give a proper distribution of forces, since it will be realized that the punch pressure is off center and takes place within the area between the beams 36, 37, 38 and 39. The first three of the last named beams have integrally formed therewith a web 44 that has an abutment screw 45 threaded therein for a purpose to be described.

The front portion of the base is suitably webbed as will appear. About the base there are provided a number of feed 46 on which the machine rests, and a number of bosses 47 to receive hood screws to be described.

The journal box 33 is drilled to receive a central shaft 50. It also has an annular pocket 51 surrounding the shaft in which is mounted a felt oil pad 52, and surrounding the pocket 51 is an annular bearing surface 53. The center shaft 50 is pressed into the journal box 33 and is not rotatable with respect thereto.

A die carrier 56 has a long central tubular column 57 journaled on the center shaft 50, and bearing at its bottom on the annular surface 53. A plurality of radial arms 59 extend outwardly from the bottom of the center column to a die supporting ring 60 (Fig. 3). About the ring are a series of spaced screw-receiving openings 61 receiving screws 62 that hold dies 63 in place on the ring at a radial distance sufficient to permit them to be brought over the punch area of the bed 30. The dies are interchangeable because of the uniformity of the screw holes.

Emanating from the central column 57 is a table 66 to which is bolted an annular punch carrier 67. At its outer edge this punch carrier rises upwardly to provide an upper flange 68 opposite a lower flange 69 which flanges provide for the guiding of the punches.

Each punch includes a punch shank 70 slidably mounted in spaced openings in the flanges 68 and 69. At its upper part, each shank has a plunger-receiving neck 71, and between the two flanges an additional neck 72 to receive a spring clip 73 of the shape shown in Fig. 9. About the shank there is also a coil spring 74 of the compression type acting between the flange 69 and the clip 72, urging the punch upwardly.

On each shank 70, beneath the flange 69, there is a punch-supporting plate 75 having a vertically bent tongue 76 guided within a hole 77 in the punch carrier. This latter action prevents rocking of the punch during the pressing action. Each punch 78 is mounted on a punch plate 79 secured to the plate 75.

As is evident, there are a series of punches and dies corresponding to the desired letters, numbers, and the like. Each punch has its corresponding die mounted beneath it on the ring 60 and, as will be shown, any pair may be selectively located in cutting position.

Secured to the top of the column 57 there is a depending portion 82 of a circular operating hand wheel 83. The operating hand wheel has an index pointer 84 attached thereto and which cooperates with a dial plate 85 mounted on a hub 86, which hub is adjustably secured as at 87 to the center shaft 50. The dial is so arranged that when the pointer 84 is brought to any character on the dial, the punch and die of that character will be located in cutting position.

The dial has an oil hole 90 therein immediately above an oil groove 91 in the center shaft. This groove extends down to a point well below the top of the center column 57. When oil is dropped through the hole 90 and into the groove 91 it will lubricate the entire bearing and finally the surplus will descend to reach the felt pad 51 wherein it is stored to provide lubrication for an indefinite period, of the bearing 53.

Over the entire top of the machine is a hood or cover 94 through which the hand wheel hub passes. There are suitable bosses 95 on the side edges of the cover to receive screws 96 by means of which the cover is secured to the fastening lugs 47 of the base.

On the front of the machine is the punch centering and actuating means and a paper feeding means which will now be described. The cover 94 has a housing 97 on the front thereof, in which a large part of the said mechanism is mounted. This housing includes a main wall 98 and a front wall 99, the latter having an opening 100 normally closed by a closure plate (not shown).

The wall 98 carries the load applied to the handle, and hence the reaction of which the punching force is the action. The shape of the hood, including its heavy side walls, and the front-to-back ridge extending along its top, make it substantially rigid so as to minimize deflections by said reactions.

In the wall 98 there is an opening 102 shaped something like a dumbbell with enlargements at the top and the bottom joined by a narrower connecting portion. This connecting portion has opposed vertical grooves 103 in its edges that receive guides 104 on the opposite sides of a punch actuating plunger, generally indicated at 105. This plunger has a notch 106, somewhat wider than the vertical thickness of the head of the punch shanks, providing a surface 107 for depressing the punches and an edge 108 for ensuring their withdrawal. As is evident from Fig. 4, when any punch is brought to actuating position, its head engages in the notch 106 of the plunger.

The plunger has at its top a pivot pin 110 including a spacing shoulder 111, the latter being sufficient to carry the pivot to the front of the wall 98 as appears in Fig. 15.

A limiting screw 112 having a lock nut 113 thereon is adjustable to determine the upper limit of movement of the plunger 105, to insure that the plunger will be in proper position to engage over the punch shank heads.

A link plate 115 of the bell crank type has a slot 116 engaging over the pivot 110. The plate in turn is pivotally mounted to the wall 98 on a bushing 117 held by a screw 118.

On the other angle of the link plate 115, there is pivoted at 119 a link 120, the other end of which is pivoted at 121 to a combination link and cam plate 122. This latter plate 122 is pinned at 123 to rotate to the hub 124 of a handle member 125.

The pivot 121 receives one end of a return coil spring 126, the other end of which is attached at 127 to the wall 98. This is a tension spring that normally pulls the link 120 to the right in Figs. 2, 10, 16 and 17, and with it the associated mechanism, such movement returning the punch to its retracted position.

The plate 122 also has a cam edge 128 engageable with a roller 129 located in the middle of a link 130 pivoted at its upper end to the wall 98 on a screw 131. This link is shown separately in Fig. 18. Its lower end engages a screw 132 adjustably projecting from the outer end of a horizontal lever 133 pivoted at 134 to a boss 135 projecting from the back of the wall 98. The inner end of the lever 133 has a roller 136 engageable between adjacent punch shanks to center and hold immovable the punch carriage in such position that the actuated punch is in exact alignment at the cutting portion of the machine. A coil spring 137 is fastened between the inner end of the lever and the front wall 99 to maintain the centering lever normally in inactive position.

The handle 125 and the plate 122 are mounted on a shaft 138 passing through the wall 98 and secured thereto by a nut (Fig. 11). A washer 139 secured to the shaft by a screw prevents the hub 124 from coming off of the shaft.

It is quite evident that during the first and major part of the movement of the handle 125, the punch, although moving down, is above the work and consequently is not cutting. However, as will be shown, the work feed mechanism is in operation during such interval. This work feed mechanism is operated off the pivot 119 between the link plate 115 and the link 120. Fig. 12 shows this pivot 119 in detail. On its outer end it has a roller 140 held by a nut 141, the nut engaging on a shoulder to allow free rotation of the roller. This roller rides on a cam link 142 that is pivoted at 143 to the wall 98, but spaced therefrom by a spacer member 144. This cam link 142 has a bell crank 145 pivoted at 146 to its other end. A tension spring 147 acts on one end of the bell crank lever 145 and is also attached to a pin 148 (Fig. 15), extending from the wall 99. The spring 147 keeps the bell crank lever 145 in a clockwise direction, viewed from the front of the machine.

The other end of the bell crank lever has a ratchet dog 150 (Fig. 15) engaging with the teeth of a ratchet wheel 151 that is mounted to rotate with a serrated feed roller 152 that is attached to the lowest end of the wall 98. A light leaf spring 153 (Fig. 17) is secured to the wall 98 and bears against the back surface of the feed roller 152 to prevent its coasting.

The cam link 142 has a cam edge 154 thereon that is engaged by the roller 140. By this means when the crank 125 is depressed the link 120 moves to the left and with it the roller 140; and the latter acting upon the cam edge 154 pivots the cam lever 142 clockwise moving the bell crank lever 145 downwardly so that its dog 150, maintained in engagement with the teeth of the ratchet 151 by means of the spring 147, rotates the ratchet wheel a given angular distance clockwise, and with it rotates the feed wheel 152. This angular distance is equal to the distance between the characters.

After the cam roller 140 is moved over the hump of the cam edge 154, additional movement of the link 120 and the roller 140 about the pivot 117 produces no additional movement of the feed roll. The cam is designed so that all of the feeding takes place during the first approximately 60% of the lowering of the punch and before the actual cutting operation takes place.

Where it is desired to limit the action merely to feeding and not to punching, this can be attained by pressing inwardly a button 156 on the handle 125, which button is attached to a pin 157 having a head 158. A spring 159 normally maintains the pin and the head 156 in their outward positions. When the button is pressed, however, the pin 158 moves out back of the handle 125 in position to engage a knob 160 that is formed as a boss on the front wall 99 of the hood. By the simple expedient of pressing the button 156, the operator can move the handle to feed the work forward, and will not have to concern himself with stopping the handle before cutting, because such is automatically accomplished by engagement of the pin with the knob 160.

The total downward movement of the handle 125 is limited by engagement of a prong 161 projecting from the hub 124, and in the path of which a screw 162 is adjustably threaded into the top of the housing 97, and maintained in adjusted position by a lock nut.

Spaced from the feed roll 152 is a second follower roll 165 also mounted on the lower part of the wall 98, it being secured by a screw 166 (Fig. 11).

The upper part of the front section 31 of the frame forms a table 167 upon which the work rests. The hood 94 is spaced upwardly at its lower edges in the front from the die member 59 and the bed 39 so that the work may be slipped under the hood and under the punches. The two feed rolls 152 and 165 are located above the table 167 and at the rear edge thereof immediately in front of the die member 59.

There are presser rollers 168 and 169 projecting upwardly through the back part of the table 167 for cooperation respectively with the feed rolls 152 and 165. Both of the rollers 168 and 169 are mounted for rotation on a bar 170 that is restrictedly floatingly mounted in slots 171 and 172 in webs 173 and 174, respectively, in the lower part of the front section 31 of the base. Screws 175 and 176 greater in diameter than the slots are wide are threaded into adjacent walls of the slots and held by lock nuts 177 to restrict downward movement of the ends of the bar 170.

The bar has a link 180 pivoted to a point slightly off-center thereof, and extending downwardly therefrom. This plate is engaged by a pin 181 eccentrically formed on the end of the shaft 182, which shaft is journaled in a bearing 183 in a middle web of the front portion 31 of the device and a bearing 184 in a front web of wall 185 that is indented from the main part of the front wall of the machine, as shown at 186. The shaft 182 projects through the wall 185 and outside the same has an operating arm 187 located in the indentation 186 and by means of which the shaft may be rocked. It will be seen that rocking the shaft will lower the bar 170 and with it the two rolls 168 and 169.

A collar 189 is fastened adjustably about the shaft 182 by a set screw 190. The collar supports a pin 191 receiving one end of a coil tension spring 192, the other end of which is engaged in a pin 193 in the web 173. This spring normally maintains the handle 187 upwardly, in which position the presser rollers 168 and 169 are urged upwardly against the feed rolls 152 and 165 so as to press the work against the last two named rollers and thereby to clamp it in position. As is evident, the tension of the spring 192 may be varied by adjusting the collar 189.

A latch is provided for holding the rolls 168 and 169 in downward or inoperative position. This latch includes a latch link 195 pivoted at 196 to a lower web of the front section 31. A notch 197 is engageable with a pin 198 on the shaft 182 when the shaft is rotated by the handle 187 to inactive position, a rotation of about 30 degrees. The pin 198 engages in the notch 197 and is thereby prevented from returning to active position.

To release the latch, there is provided a plunger 199 forked at one end over the latch 195 and pivoted thereto at 200. The plunger passes through the wall 185 and has a push button 201 on the outer end thereof within the indentation 186. A coil spring 202 engages between the pivot 200 and the pin 204 within the wall 185. This spring normally urges the plunger and with it the latch 195 into position to be engaged by the pin 198. Hence, normally, upon pressing down of the handle 187 to lower the presser rolls 168 and 169, the latch 195 will become effective to hold the rolls in lower position. Pressing the button 201 however, releases the latch and permits the spring 192 to return the shaft 182 and, by means of it, the presser rolls 168 and 169 to operating position.

There is also provided a work guide and stripper plate 210. The stripper plate portion 211 has a front part 212 turned up at right angles and having slots 213 engageable by the pivots upon which the rolls 152 and 165 are mounted on the wall 98. The slots permit vertical adjustment of the plate. The plate has a central opening 214 through which the die passes in the cutting operation. The work, however, is maintained on the bottom side of the plate 211 so that, upon withdrawal of the punch, the work is stripped therefrom. A wire guide 215 extends, as shown in Fig. 20, to guide the work and keep it from irregularities while passing laterally through the machine.

For aligning the direction of the feed rolls, and hence the direction imparted to the work passing through the machine, the rolls 168 and 169 are mounted on the bar 170; and this bar, somewhat flexible, is attached to an angle iron 220. The connection at one end is by means of a screw 221 and a suitable spacer collar. There is a similar connection 221 at the middle. At the other end, however, there is a screw 223 threaded through the bar 170 and passing through the angle iron 220. Lock nuts 222 determine the spacing between the bar 170 and the angle iron 220 and, of course, permit a variation of this distance. Since the angle iron 220 is substantially inflexible, adjustment of the nuts 222 will, by flexing of the bar 170, vary the position of the roller 168 slightly forward or backward relative to the roller 169 and, therefore, will vary the direction of travel of the stencil through the machine.

On the top of the table 167 are provided a series of guide lines 225 and an inner guide line 226. The guide lines 225 give the proper positions for the bottom of a stencil card for cutting one or more lines of characters therein. The line 226 indicates a point to which the card must be inserted to insure that the characters will be completely contained within its borders. A line 228 determines the distance leftward to which the card must be moved to obtain proper cutting within the lateral limits thereof. There is also provided a small square index 227 indicating the size and alignment of the characters.

The operation of the device is as follows:

A suitable card C, on which it is desired to cut characters, is placed upon the table 167. The handle 187 is depressed, withdrawing the presser rolls 168 and 169 from the rollers 152 and 165 so that the card may be fed to the left until its left edge at least reaches the line 228, and inwardly at least to a point where its upper edge is as far in as the line 226, and with its lower edge on a line 225. The button 201 is then pressed, unlatching the shaft 182 and permitting the presser rolls 168 and 169 to move upwardly and press the card against the rolls 152 and 165. By rotation of the hand wheel 83, the desired character is brought beneath the index 84. The operating handle 125 is then pressed downwardly. During the first approximately twenty per cent of this downward movement, the cam 122 acts quickly upon the roller 129, causing the link 130 to pivot about its center 131 and, by contact with the adjustable screw 132, move one end of the horizontal centering lever 133 which pivots about its center 134 to cause the roller 136 on the other end to engage adjacent punch shanks, and thereby to fix the rotating punch carriers against rotation and with the proper one centered in cutting position. The extra height of the notch 106 in the punch plunger 105 permits at least a part of this centering action to take place before displacement of the punch begins.

During the next part of the movement of the handle 125, the roller 140 operating on the cam edge 154 of the link 142 moves that link downwardly and, through the ratchet mechanism, advances the feed roll 152 a predetermined space proper for the distance between successive characters. The roller 140 is over the hump of the cam prior to the time that the actual cutting by the punch begins.

In the foregoing, it will be seen that the leverage of the handle through the toggle linkage is such that, during the movement so far described, a relatively small amount of movement of the handle produces a comparatively large amount of movement of the punch shank. During this time, the toggle links have been approaching a continuous line with the pivot 121 between the pivot 119 and the hub 124, increasing the leverage of the handle 125 and reducing the amount of movement of the plate 115 and the plunger 105 for a given displacement of the handle 125. When the lever 125 is in its lower position after it has completed the centering and feed operations and when the punch is about ready to pass through the material, its leverage is at its maximum. This gives the obvious advantage that where very little power is required only a small amount is used, but where more is necessary it is provided. This also effects a conservation of handle movement in that, for the most part, little actual displacement of the handle is required. When the handle forces the punch through the work, any deflection of the carrier 56 causes it to strike the screw 45 and thereby be prevented from further deflection. The rigid construction of the bed substantially prevents it from deflecting, it being designed to receive force at this point, as heretofore described.

Upon release of the handle, the springs 126 and 147, acting on the linkages, return it to its starting position. The centering mechanism by its spring 137 is also returned to starting position and the bell crank ratchet arm 145 moves backward to another tooth on the ratchet wheel to be ready for the new feed.

Should there occur a point for spacing between words, the button 156 is pressed and the handle 125 depressed until the pin 158 strikes the knob 160. In this operation, the handle will have gone down far enough to advance the feed mechanism one notch but insufficiently to have operated the punch in the work.

At the end of the line, the work is moved in toward the machine to a successive line 225 and the operation is repeated. Should it be necessary to replace the work in the machine after withdrawal, location of a character of a given line over the square 227 gauges the location of that line relative to the punches.

As noted, the feed mechanism can be adjusted by the nuts 222 to insure that the work will be fed in a proper line through the machine. It will be seen by reference to Figs. 5 and 8 that the force applied by the eccentric lug 181 through the member 180 is nearer the presser roller 168 than the roller 169. As a consequence, there is more pressure applied to the feed roller 152 than to the follower roller 165. Approximately sixty percent of the total pressure is applied to the feed roller 152 and forty percent to the trailing guide roller 165. The fact that the bar 170 floats over the screws 175 and 176 insures that the pressure will be divided between the two rollers.

Feeding the stencil board on the downward stroke reduces the possibility of cutting one letter into another by error. There will always be a feed after the work is inserted before the cutting takes place. There will also be a full space, or none at all, before a cut because of the action of the centering and locking mechanism. It, therefore, cooperates with the mechanism for feeding on the down stroke to insure the full spacing. The return spring of the handle merely acts for that purpose and not to cause the feeding. Hence, the handle effort is reduced because it is necessary to overcome only a slight spring.

Only a short movement of the handle is required for the cutting, which is made possible because of the great leverage of the toggle mechanism.

We claim:

1. In a mechanism of the kind described, a base, a pair of rollers aligned for use in feeding material by its successive passage over them, and means mounting said rollers on the base, said mounting means having a displaceable portion holding one roller whereby it may be shifted relative to the other to change the direction of travel of the work.

2. In a mechanism of the kind described, a base, a pair of rollers spaced for use in feeding material by successive passage over them, said rollers having normally parallel axes, and means mounting one of said rollers on the base for adjustment of its axis relative to that of the other to cause adjustment of the feed.

3. In a mechanism of the kind described, a base, a bar maintained on the base, a pair of rollers mounted successively on the bar, a stiffener extending alongside of the bar, and spaced connections between the stiffener and the bar, one of which is adjustable to vary the spacing between the bar and the stiffener at that locality, whereby to change the alignment of the rollers.

4. In a mechanism of the kind described, a pair of pressure members for use in a feed means, means to urge said pressure members into operating position, and means connecting said urging means to said pressure means to distribute the pressure more on one pressure member than on the other.

5. In a mechanism of the kind described, a pair of pressure members for use in a feed means, a holder for said members, a feed roller cooperating with one pressure member and a follower roller cooperating with the other, means to urge the pressure members against their rollers, means connecting the urging means to the holder closer to the feed roller than to the follower roller, and means providing adjustment of the urging means.

6. In a mechanism of the kind described, a set of pressure applying means comprising a pair of pressure elements adapted to engage a device to be pressed, backing means for said pressure elements, a support holding and joining both elements, means adapted to apply displacing force to the support to cause it to move the elements into pressure applying position, said displacing force means acting upon the support nearer one element than to the other, whereby a tighter clamping engagement may be had at said nearer element.

7. In a mechanism of the kind described, a set of pressure applying means comprising a pair of pressure elements adapted to engage a device to be pressed, backing means for said pressure elements, a support holding and joining both elements, means adapted to apply displacing force to the support to cause it to move the elements into pressure applying position, said displacing force means acting upon the support nearer one element than to the other, whereby a tighter clamping engagement may be had at said nearer element, said displacing force means comprising an oscillatory element, spring means normally urging the same to oscillate in a direction to move the clamping elements into clamping position, and separate means to move the same in the other or open direction.

8. In a mechanism of the kind described, a set of pressure applying means comprising a pair of pressure elements adapted to engage a device to be pressed, backing means for said pressure elements, a support holding and joining both elements, means adapted to apply displacing force to the support to cause it to move the elements into pressure applying position, said displacing force means acting upon the support nearer one element than to the other, whereby a tighter clamping engagement may be had at said nearer element, said displacing force means comprising an oscillatory element, spring means normally urging the same to oscillate in a direction to move the clamping elements into clamping position, separate means to move the same in the other or open direction, latching means operable to hold said element in open position, and means to release said latching means.

9. In a mechanism of the kind described, a table, a bar resistingly flexible in a lateral direction, means supporting the bar edgewise on the table, a pair of rollers mounted in spaced relation on the bar, the axes of the rollers being parallel, an angle iron, means securing the iron to the bar at two points, means for adjustably drawing a third point on the bar toward and from the iron, whereby to change the shape of the bar and the alignment of the roller edges, and backing means cooperable with the rollers.

HERBERT W. HEMPEL.
WALTON C. MARSH.